US012373290B2

(12) United States Patent
Feng

(10) Patent No.: US 12,373,290 B2
(45) Date of Patent: Jul. 29, 2025

(54) MEMORY SYSTEMS AND OPERATION METHODS THEREOF

(71) Applicant: Yangtze Memory Technologies Co., Ltd., Hubei (CN)

(72) Inventor: Yufei Feng, Hubei (CN)

(73) Assignee: YANGTZE MEMORY TECHNOLOGIES CO., LTD., Hubei (CN)

( * ) Notice: Subject to any disclaimer, the term of this patent is extended or adjusted under 35 U.S.C. 154(b) by 3 days.

(21) Appl. No.: 18/348,695

(22) Filed: Jul. 7, 2023

(65) Prior Publication Data

US 2024/0311237 A1 Sep. 19, 2024

(30) Foreign Application Priority Data

Mar. 14, 2023 (CN) ......................... 202310255549.4

(51) Int. Cl.
*G06F 11/10* (2006.01)
*G06F 11/07* (2006.01)

(52) U.S. Cl.
CPC ...... *G06F 11/1068* (2013.01); *G06F 11/0763* (2013.01)

(58) Field of Classification Search
CPC ......................... G06F 11/1068; G06F 11/0763
See application file for complete search history.

(56) References Cited

U.S. PATENT DOCUMENTS

2008/0254544 A1* 10/2008 Modzelewski ..... G06F 11/0763 706/14
2012/0042219 A1* 2/2012 Lasser ................. G11C 11/5621 714/704
2020/0186171 A1* 6/2020 Lin ..................... G06F 11/1012

FOREIGN PATENT DOCUMENTS

KR 20140072855 A * 6/2014

* cited by examiner

*Primary Examiner* — Mark D Featherstone
*Assistant Examiner* — Jeffrey Andrew Yang
(74) *Attorney, Agent, or Firm* — HANLEY, FLIGHT & ZIMMERMAN, LLC

(57) ABSTRACT

An example memory system includes a memory device and a memory controller coupled to the memory device. The memory device may include memory cells having a memory bit count of multiple bits, the memory cells include first and second types of memory bits, the first type of memory bits are used to store valid data, the second type of memory bits are used to store first type of check data, and the first type of check data is obtained by performing error correction encoding on the valid data stored in the first type of memory bits. The memory controller is configured to: perform error correction on the valid data in which an error occurs by at least using the first type of check data in the second type of memory bits when the error occurs in reading the valid data in the first type of memory bits.

20 Claims, 9 Drawing Sheets

UP = LP OR MP

| UP | | MP 0 | MP 1 |
|---|---|---|---|
| LP | 0 | 0 | 1 |
| LP | 1 | 1 | 1 |

XP = (~LP) OR MP

| XP | | MP 0 | MP 1 |
|---|---|---|---|
| LP | 0 | 1 | 1 |
| LP | 1 | 0 | 1 |

| MP | UP | XP | LP | First information (Probability R) | |
|---|---|---|---|---|---|
| 1 | 1 | 1 | 0 | 50% | |
| 1 | 1 | 1 | 1 | 50% | |
| 0 | 0 | 1 | 0 | 0% | |
| 0 | 0 | 1 | 1 | 100% | LP error bit |
| 0 | 1 | 0 | 1 | 0% | |
| 0 | 1 | 0 | 0 | 100% | LP error bit |

MEMORY SYSTEMS AND OPERATION METHODS THEREOF

CROSS-REFERENCE TO RELATED APPLICATIONS

This application claims priority to and the benefit of Chinese Patent Application 2023102555494, filed on Mar. 14, 2023, which is hereby incorporated by reference in its entirety.

TECHNICAL FIELD

The present disclosure relates to the field of semiconductor technology, and in particular, to a memory systems and operation methods thereof.

BACKGROUND

Memory is a memory device used to save information in modern information technology. As a typical non-volatile semiconductor memory, NAND (Not-And) memory has become a mainstream product in the market due to its high storage density, controllable production cost, suitable programming and erasing speed and retention characteristics.

However, as requirements for memory continue to increase, there is much room for improvement in memory and its systems.

Figure 1:
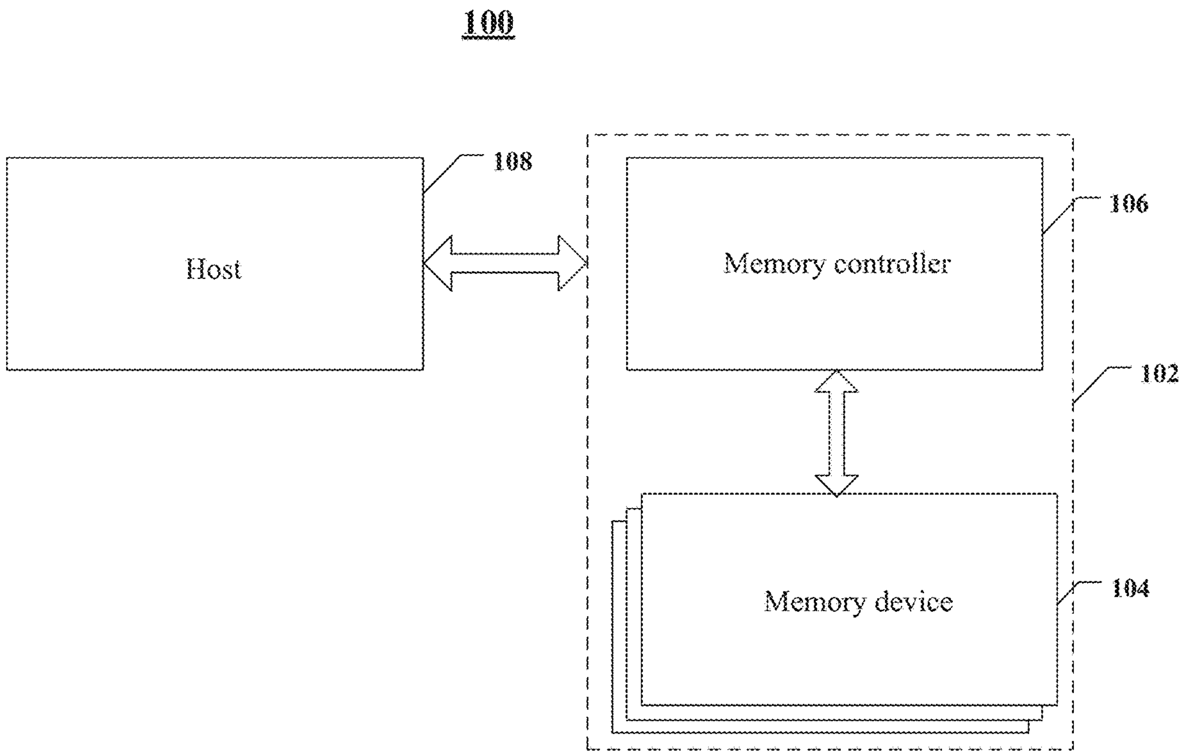
FIG. 1 is a schematic diagram of an example system with a memory system according to an example of the present disclosure.

In the above drawings (which are not necessarily drawn to scale), like reference numerals may describe like parts in the different views. Similar reference numbers with different letter suffixes may indicate different examples of similar components. The drawings generally illustrate the various examples discussed herein, by way of example and not limitation.

DETAILED DESCRIPTION

Examples of the present disclosure will be described in more detail below with reference to the accompanying drawings. Although examples of the present disclosure are shown in the drawings, it should be understood that the present disclosure may be implemented in various ways and should not be limited to the DETAILED DESCRIPTION set forth herein. Rather, these examples are provided so that the present disclosure can be more thoroughly understood and the scope of the present disclosure can be fully conveyed to those skilled in the art.

In the following description, numerous specific details are given in order to provide a more thorough understanding of the present disclosure. It will be apparent, however, to one skilled in the art that the present disclosure may be practiced without one or more of these details. In other examples, some technical features may be omitted to avoid confusion with the present disclosure; that is, not all features of the actual examples may not be described here, and well-known functions and structures are not described in detail.

In the drawings, the size of layers, regions, elements and their relative sizes may be exaggerated for clarity. Like reference numerals refer to like elements throughout.

It will be understood that when an element or layer is referred to as being "on." "adjacent to," "connected to" or "coupled to" another element or layer, it can be directly on, adjacent to, connected to, or coupled to other elements or layers, or intervening elements or layers may be present. In contrast, when an element is referred to as being "directly on." "directly adjacent to," "directly connected to" or "directly coupled to" another element or layer, there are no intervening elements or layers. It will be understood that, although the terms such as first, second, third etc. may be used to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be represented as a second element, component, region, layer or section without departing from the teachings of the present disclosure. When a second element, component, region, layer or section is discussed, it does not indicate that a first element, component, region, layer or section necessarily exists in the present disclosure.

Spatial terms such as "under", "below", "beneath", "underneath", "on", "above" and so on, can be used here for convenience to describe the relationship between one element or feature and other elements or features shown in the figures. It will be understood that the spatially relationship terms also comprise different orientations of the device in use and operation in addition to the orientation depicted in the figures. For example, if the device in the figures is turned over, elements or features described as "below" or "underneath" or "under" other elements or features would then be oriented as "above" the other elements or features. Thus, the example terms "below" and "under" can comprise both orientations of above and below. The device may be otherwise oriented (rotated 90 degrees or at other orientations) and the spatial descriptors used herein may be interpreted accordingly.

The terminology used herein is for the purpose of describing particular examples only and is not to be taken as a limitation of the present disclosure. As used herein, "a", "an" and "said/the" in singular forms are intended to include the plural forms as well, unless the context clearly dictates otherwise. It should also be understood that the terms "consists of" and/or "comprising", when used in this specification, identify the presence of stated features, integers, steps, operations, elements and/or components, but do not exclude presence or addition of one or more other features, integers, steps, operations, elements, components and/or groups. As used herein, the term "and/or" includes any and all combinations of the associated listed items.

For ease of understanding the characteristics and technical content of the examples of the present disclosure in more detail, the implementation of the examples of the present disclosure will be described in detail below in conjunction with the accompanying drawings. The attached drawings are only for reference and description, and are not intended to limit the examples of the present disclosure.

The memory in the examples of the present disclosure includes but is not limited to a three-dimensional NAND type memory, and for ease of understanding, a three-dimensional NAND type memory is used as an example for illustration.

FIG. 1 illustrates a block diagram of an example system 100 having memory, according to some aspects of the present disclosure. System 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 1, system 100 can include a host 108 and a memory system 102 having one or more memory 104 and a memory controller 106. Host 108 can be a processor of an electronic device, such as a central processing unit (CPU), or a system-on-chip (SoC), such as an application processor (AP). Host 108 can be configured to send or receive data to or from memory 104.

Memory controller 106 is coupled to memory 104 and host 108 and is configured to control memory 104, according to some implementations. Memory controller 106 can manage the data stored in memory 104 and communicate with host 108. In some implementations, memory controller 106 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc. In some implementations, memory controller 106 is designed for operating in a high duty-cycle environment solid state disks (SSD) or embedded multi-media-cards (eMMCs) used as data storage for mobile devices, such as smartphones, tablets, laptop computers, etc., and enterprise storage arrays.

Memory controller 106 can be configured to control operations of memory 104, such as read, erase, and program operations. Memory controller 106 can also be configured to manage various functions with respect to the data stored or to be stored in memory 104 including, but not limited to bad-block management, garbage collection, logical-to-physical address conversion, wear leveling, etc. In some implementations, memory controller 106 is further configured to process error correction codes (ECCs) with respect to the data read from or written to memory 104. Any other suitable functions may be performed by memory controller 106 as well, for example, formatting memory 104. Memory controller 106 can communicate with an external device (e.g., host 108) according to a particular communication protocol. For example, memory controller 106 may communicate with the external device through at least one of various interface protocols, such as a USB protocol, an MMC protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

Figure 2A:
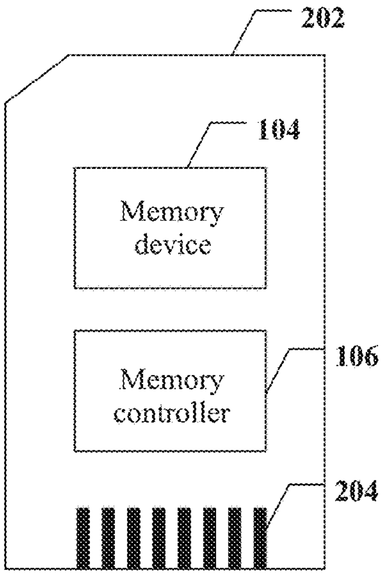
FIG. 2*a* is a schematic diagram of an example memory card with a memory system according to an example of the present disclosure.
Figure 2B:
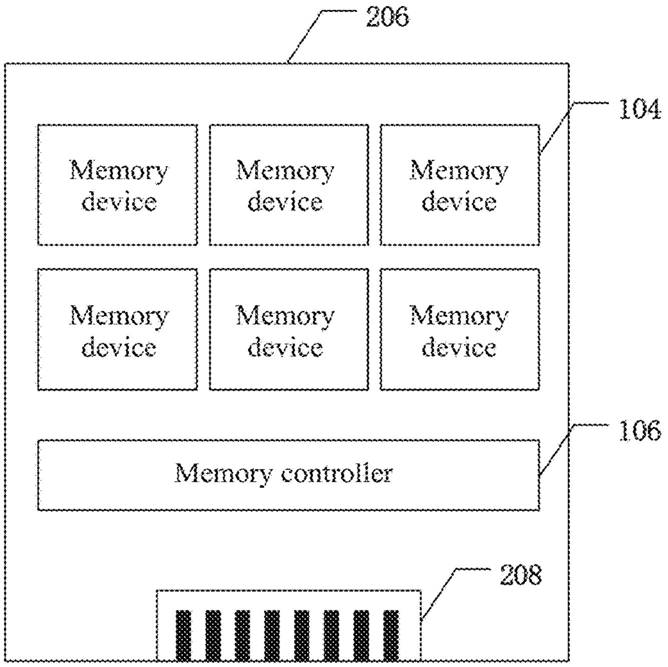
FIG. 2*b* is a schematic diagram of an example solid state drive with a memory system according to an example of the present disclosure.

Memory controller 106 and one or more memory 104 can be integrated into various types of storage devices, for example, be included in the same package, such as a universal Flash storage (UFS) package or an eMMC package. That is, memory system 102 can be implemented and packaged into different types of end electronic products. In one example as shown in FIG. 2*a*, memory controller 106 and a single memory 104 may be integrated into a memory card 202. Memory card 202 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 202 can further include a memory card connector 204 coupling memory card 202 with a host (e.g., host 108 in FIG. 1). In another example as shown in FIG. 2*b*, memory controller 106 and multiple memory 104 may be integrated into an SSD 206. SSD 206 can further include an SSD connector 208 coupling SSD 206 with a host (e.g., host 108 in FIG. 1). In some implementations, the storage capacity and/or the operation speed of SSD 206 is greater than those of memory card 202.

Figure 3A:
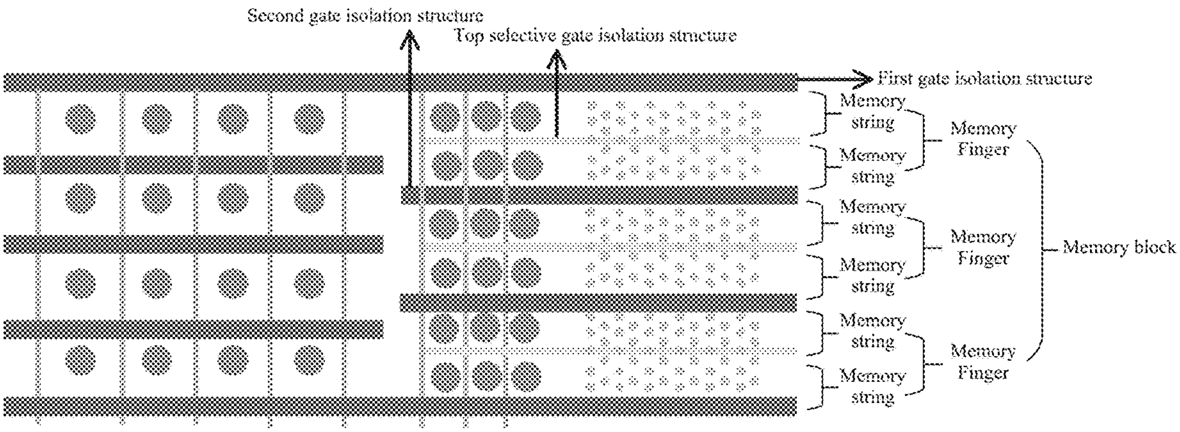
FIG. 3*a* is a schematic diagram of the distribution of memory cells of a three-dimensional NAND type memory according to an example of the present disclosure.

FIG. 3*a* provides an example a structural schematic diagram of a memory array of a three-dimensional NAND type memory. As shown in FIG. 3*a*, the memory array of a three-dimensional NAND type memory consists of several memory cell rows parallel to gate isolation structure and staggered in parallel. Every two rows of the memory cell rows are separated by a gate isolation structure and a top selective gate isolation structure, and each memory cell row includes a plurality of memory cells. The gate isolation structure may include a first gate isolation structure and a second gate isolation structure. The first gate isolation structure divides the memory array into a plurality of memory blocks, the plurality of second gate isolation structures can divide the memory blocks into multiple memory fingers, and the top selective gate isolation structure provided in the middle of each memory finger can divide the memory finger into two parts, so that the memory finger is divided into two memory strings. A memory block shown in FIG. 3*a* contains 6 memory strings, and in practical applications, the number of memory strings in a memory block is not limited to this.

In some examples, each memory block can be coupled to multiple word lines, and multiple memory cells coupled to each individually controlled word line form a page. By way of example, all memory cells in each memory string in FIG. 3*a* are coupled to form a page.

It should be noted that the number of memory cell rows between the gate isolation structure and the top selective gate isolation structure shown in FIG. 3*a* is merely example, and is not used for limiting the number of memory cell rows contained in one memory finger of the three-dimensional NAND type memory in the present disclosure. In practical applications, the number of memory cell rows contained in one memory finger can be adjusted according to actual conditions, such as 2, 4, 8, 16, and so on.

Figure 3B:
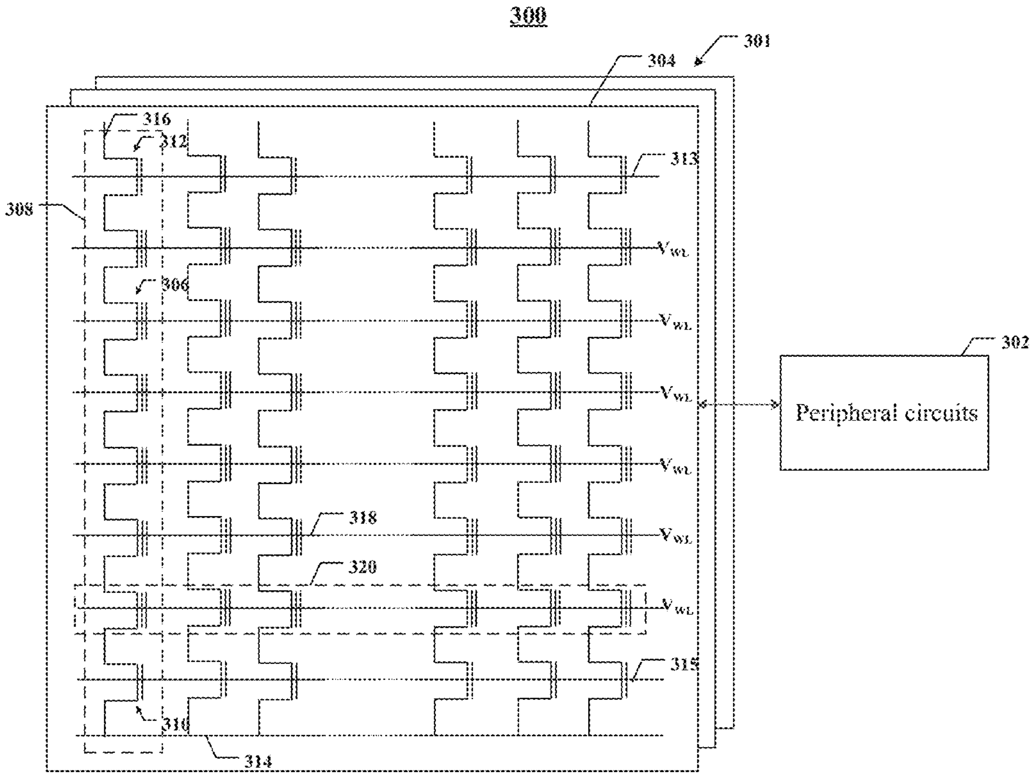
FIG. 3*b* is a schematic diagram of example memory including peripheral circuits according to an example of the present disclosure.

FIG. 3*b* illustrates a schematic circuit diagram of example memory 300 including peripheral circuits, according to some aspects of the present disclosure. Memory 300 can be an example of memory 104 in FIG. 1. Memory 300 can include a memory array 301 and peripheral circuits 302 coupled to memory array 301. The memory array 301 is illustrated as an example of a three-dimensional NAND type memory array, in which memory cells 306 are provided in the form of an array of NAND memory strings 308 each extending vertically above a substrate (not shown). In some implementations, each NAND memory string 308 includes a plurality of memory cells 306 coupled in series and stacked vertically. Each memory cell 306 can hold a continuous, analog value, such as an electrical voltage or charge, that depends on the number of electrons trapped within a region of memory cell 306. Each memory cell 306 can be either a floating gate type of memory cell including a floating-gate transistor or a charge trap type of memory cell including a charge-trap transistor.

In some implementations, each memory cell 306 is a single-level cell (SLC) that has two possible memory states and thus, can store one bit of data. For example, the first memory state "0" can correspond to a first range of voltages, and the second memory state "1" can correspond to a second range of voltages. In some implementations, each memory cell 306 is a two-level cell (multi-level cell, MLC) that is capable of storing more than one bit of data in more than four memory states. For example, the MLC can store two bits per cell, three bits per cell (also known as trinary-level cell (TLC)), four bits per cell (also known as a quad-level cell (QLC)), or five bits per cell (also known as a penta-level cell (PLC)). Each MLC can be programmed to assume a range of possible nominal storage values. In one example, if each MLC stores two bits of data, then the MLC can be programmed to assume one of three possible programming levels from an erased state by writing one of three possible nominal storage values to the cell, and a fourth nominal storage value can be used for the erased state.

As shown in FIG. 3*b*, each NAND memory string 308 can include a bottom selective gate (BSG) 310 at its source end and a top selective gate (TSG) 312 at its drain end. BSG 310 and TSG 312 can be configured to activate selected NAND memory strings 308 during read and program operations. In some implementations, the sources of NAND memory strings 308 in a same memory block 304 are coupled through a same source line (SL) 314, e.g., a common SL. In other words, all NAND memory strings 308 in the same memory block 304 have an array common source (ACS), according to some implementations. TSG 312 of each NAND memory string 308 is coupled to a respective bit line 316 from which data can be read or written via an output bus (not shown), according to some implementations. In some implementations, each NAND memory string 308 is configured to be selected or deselected by applying a select voltage (e.g., above the threshold voltage of the transistor having TSG 312) or a deselect voltage (e.g., 0 V) to respective TSG 312 through one or more TSG lines 313 and/or by applying a select voltage (e.g., above the threshold voltage of the transistor having BSG 310) or a deselect voltage (e.g., 0 V) to respective BSG 310 through one or more BSG lines 315.

As shown in FIG. 3*b*, NAND memory strings 308 can be organized into multiple memory blocks 304, each of which can have a common source line 314, e.g., coupled to the ground. In some implementations, each memory block 304 is the basic data unit for erase operations, i.e., all memory cells 306 on the same memory block 304 are erased at the same time. To erase memory cells 306 in a selected memory block 304, source lines 314 coupled to selected memory block 304 as well as unselected memory blocks 304 in the same plane as selected memory block 304 can be biased with an erase voltage (Vers), such as a high positive voltage (e.g., 20 V or more). It is understood that in some examples, erase operation may be performed at a half-memory block level, a quarter-memory block level, or a level having any suitable number of memory blocks or any suitable fractions of a memory block. Memory cells 306 of adjacent NAND memory strings 308 can be coupled through word lines 318 that select which row of memory cells 306 is affected by read and program operations. In some implementations, each word line 318 is coupled to a page 320 of memory cells 306, and the page 320 is the basic data unit for program operations. The size of one page 320 in bits can relate to the number of NAND memory strings 308 coupled by word line 318 in one memory block 304. Each word line 318 can include a plurality of control gates (gate electrodes) at each memory cell 306 in respective page 320 and a gate line coupling the control gates. In combination with FIG. 3*a* above, one page 320 includes a plurality of memory cells 306, and the plurality of memory cells are isolated by the top selective gate isolation structure and the gate isolation structure. The multiple memory cells between the top selective gate isolation structure and the gate isolation structure are arranged into multiple memory cell rows, and each memory cell row is parallel to the gate isolation structure and the top selective gate isolation structure. Memory cells in memory strings that share a same word line form a programmable (write) page.

Figure 3C:
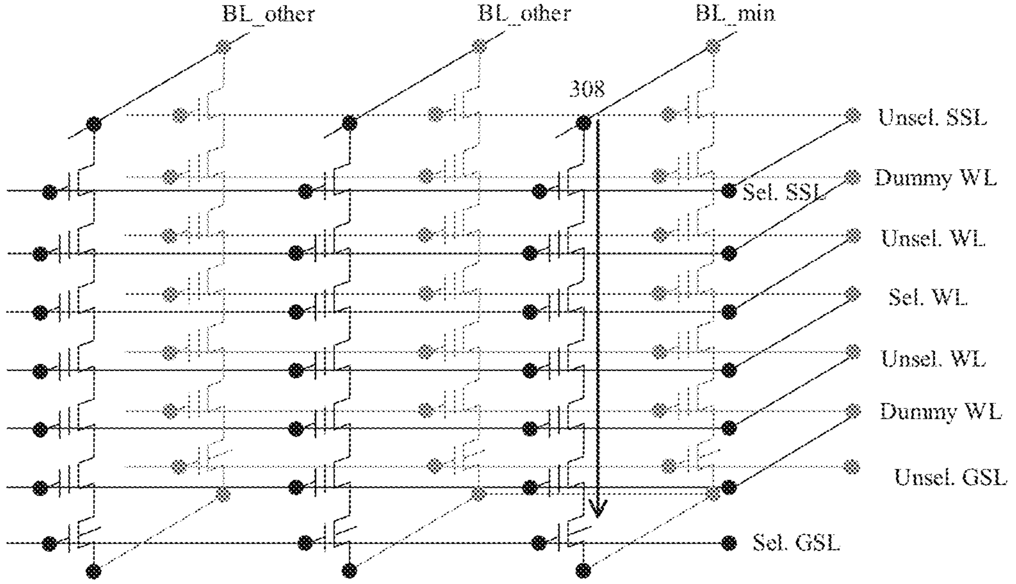
FIG. 3*c* is a schematic structural diagram of memory strings, word lines, and bit lines in the memory according to another example of the present disclosure.

Referring to FIG. 3*a*, FIG. 3*b* and FIG. 3*c*, each memory cell 306 of the plurality of memory cells is coupled to respective word line 318*s*, and each memory string 308 is coupled to respective bit lines 316 via a respective selective transistor (such as top selective transistor (TSG) 312).

Specifically, referring to FIG. 3*c*, the memory can include one or more memory strings 308 (refer to the arrows in FIG. 3*c*), and each memory string can include a top selective transistor SST corresponding to a top selective transistor gate line SSL, a ground selective transistor GST corresponding to a bottom selective transistor gate line GSL and a plurality of memory cells located between the top selective transistor and the ground selective transistor. Each memory string is connected to the respective bit lines BL and the unified common source line, respectively.

Here, referring to FIG. 3*c*, the word line coupled to the selected page is the selected word line (Sel.WL). The selected word line can be any word line of the multiple word lines in the memory, and other word lines are unselected word lines (Usel.WL) or Dummy Word Lines (Dummy WL). The bit lines BL in the memory are divided into two parts: a part of the bit lines is connected to memory cells that are in the lowest state (that is, the erased state) among the memory cells coupled to the selected word line, denoted as first bit lines (BL_min); and the other part of the bit lines is connected to memory cells other than memory cells that are in the lowest state (that is, the erased state) and have reached a target state among the memory cells coupled to the selected word line, denoted as second bit lines (BL_other). In actual operations, a certain target memory cell of the multiple memory cells can be selected by selecting corresponding word lines and bit lines for performing the corresponding read and program operations.

Figure 4:
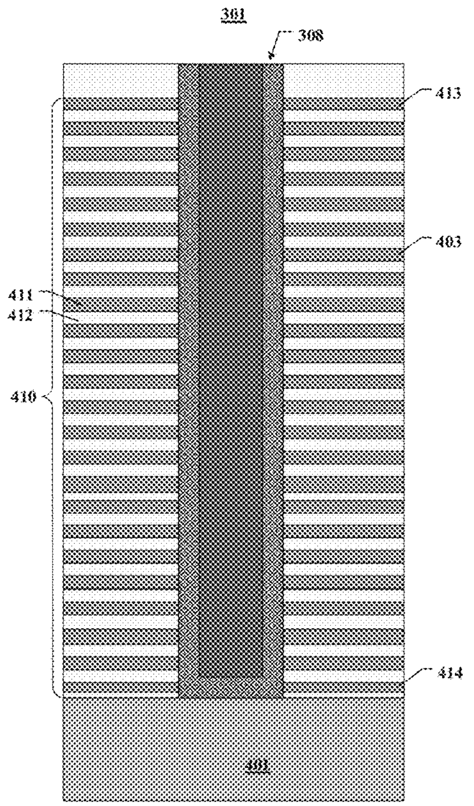
FIG. 4 is a schematic cross-sectional view of a memory array including NAND type memory strings according to an example of the present disclosure.

FIG. 4 shows a schematic cross-sectional view of an example memory array 301 including NAND memory strings 308 in accordance with aspects of the present disclosure. As shown in FIG. 4, the NAND memory string 308 may include a stacked structure 410, which includes a plurality of gate layers 411 and a plurality of insulating layers 412 alternately stacked in sequence, and a memory string 308 vertically penetrating through the gate layers 411 and the insulating layers 412. The gate layer 411 and the insulating layer 412 can be stacked alternately, and two adjacent gate layers 411 are separated by an insulating layer 412. The number of pairs of gate layers 411 and insulating layers 412 in the stacked structure 410 can determine the number of memory cells included in the memory array 401.

The constituent material of the gate layer 411 may include a conductive material. The conductive material may include but is not limited to tungsten (W), cobalt (Co), Copper (Cu), aluminum (Al), polysilicon, doped silicon, silicide, or any combination thereof. In some implementations, each gate layer 411 may include a metal layer, e.g., a tungsten layer. In some implementations, each gate layer 411 includes a doped polysilicon layer. Each gate layer 411 may include a control gate surrounding the memory cell. The gate layer 411 at the top of the stacked structure 410 may extend laterally as a top selective gate line, the gate layer 411 at the bottom of the stacked structure 410 may extend laterally as a bottom selective gate line, and the gate layer 411 extending laterally between the top selective gate line and the bottom selective gate line may be used as a word line layer.

In some examples, the stacked structure 410 may be disposed on a substrate 401. The substrate 401 may include silicon (e.g., monocrystalline silicon), silicon germanium (SiGe), gallium arsenide (GaAs), germanium (Ge), silicon-on-insulator (SOI), germanium-on-insulator (GOI), or any other suitable material.

In some examples, NAND memory string 308 includes a channel structure extending vertically through the stacked structure 410. In some implementations, the channel structure includes a channel hole filled with semiconductor material(s) (e.g., as a semiconductor channel) and dielectric material(s) (e.g., as a memory film). In some implementations, the semiconductor channel includes silicon, e.g., polysilicon. In some implementations, the memory film is a composite dielectric layer including a tunneling layer, a storage layer (also referred to as a "charge trap/storage layer"), and a blocking layer. The channel structure may have a cylindrical shape (e.g., a pillar shape). According to some implementations, the semiconductor channel, the tunneling layer, the storage layer and the blocking layer are radially arranged in this order from the center of the pillar toward the outer surface of the pillar. The tunneling layer may include silicon oxide, silicon oxynitride, or any combination thereof. The storage layer may include silicon nitride, silicon oxynitride, or any combination thereof. The blocking layer may include silicon oxide, silicon oxynitride, a high dielectric constant (high-k) dielectric, or any combination thereof. In one example, the memory film may include a composite layer of silicon oxide/silicon oxynitride/silicon oxide (ONO).

Figure 5:
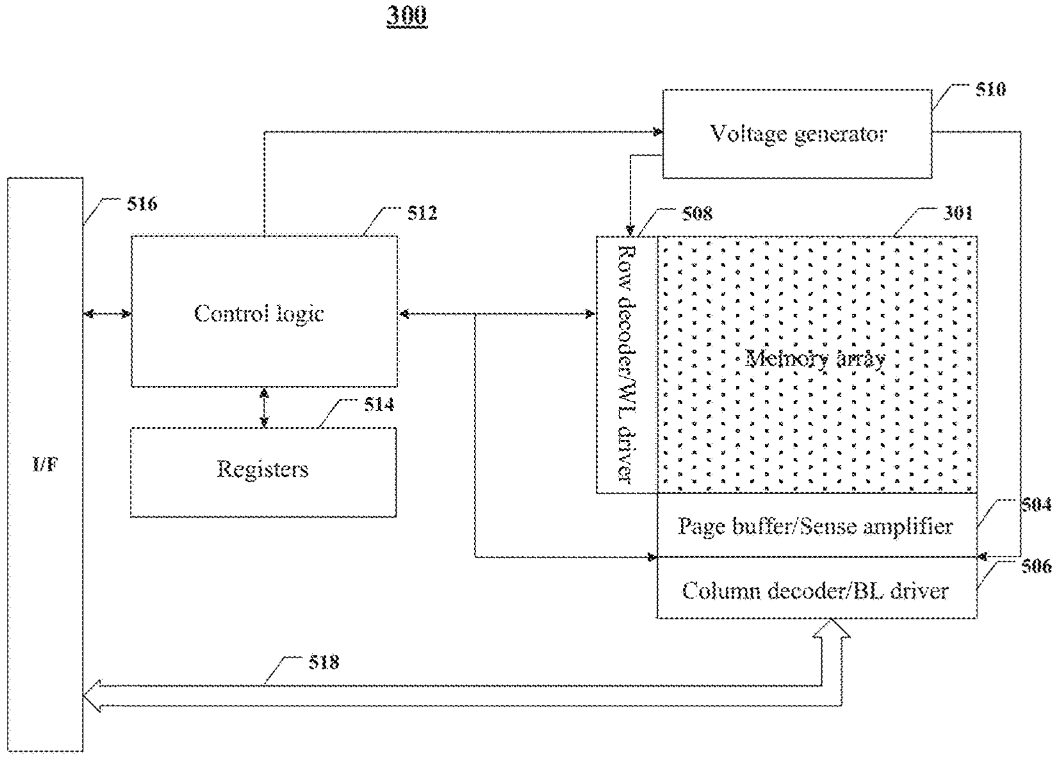
FIG. 5 is a schematic diagram of example memory including a memory cell array and peripheral circuits according to an example of the present disclosure.

Referring back to FIG. 3*b*, peripheral circuits 302 can be coupled to memory array 301 through bit lines 316, word lines 318, source lines 314, BSG lines 315, and TSG lines 313. Peripheral circuits 302 can include any suitable analog, digital, and mixed-signal circuits for facilitating the operations of memory array 301 by applying and sensing voltage signals and/or current signals to and from each target memory cell 306 through bit lines 316, word lines 318, source lines 314, BSG lines 315, and TSG lines 313. Peripheral circuits 302 can include various types of peripheral circuits formed using metal-oxide-semiconductor (MOS) technologies. For example, FIG. 5 illustrates some example peripheral circuits, the peripheral circuits 302 including a page buffer/sense amplifier 504, a column decoder/bit line driver 506, a row decoder/word line driver 508, a voltage generator 510, control logic 512, registers 514, an interface 516, and a data bus 518. It is understood that in some examples, additional peripheral circuits not shown in FIG. 5 may be included as well.

Page buffer/sense amplifier 504 can be configured to read and program (write) data from and to memory array 301 according to the control signals from control logic 512. In one example, page buffer/sense amplifier 504 may store one page of program data (write data) to be programmed into one page 320 of memory array 301. In another example, page buffer/sense amplifier 504 may perform program verify operations to ensure that the data has been properly programmed into memory cells 306 coupled to selected word lines 318. In still another example, page buffer/sense amplifier 504 may also sense the low power signals from bit line 316 that represents a data bit stored in memory cell 306 and amplify the small voltage swing to recognizable logic levels in a read operation. Column decoder/bit line driver 506 can be configured to be controlled by control logic 512 and select one or more NAND memory strings 308 by applying bit line voltages generated from voltage generator 510.

Row decoder/word line driver 508 can be configured to be controlled by control logic 512 and select/deselect blocks 304 of memory array 301 and select/deselect word lines 318 of block 304. Row decoder/word line driver 508 can be further configured to drive word lines 318 using word line voltages generated from voltage generator 510. In some implementations, row decoder/word line driver 508 can also select/deselect and drive BSG lines 315 and TSG lines 313 as well. As described below in detail, row decoder/word line driver 508 is configured to perform program operations on the memory cells 306 coupled to the selected word line(s) 318. Voltage generator 510 can be configured to be controlled by control logic 512 and generate the word line voltages (e.g., read voltage, program voltage, pass voltage, channel boost voltage, verification voltage, etc.), bit line voltages, and source line voltages to be supplied to memory array 301.

Control logic 512 can be coupled to each peripheral circuit described above and configured to control operations of each peripheral circuit. Registers 514 can be coupled to control logic 512 and include status registers, command registers, and address registers for storing status information, command operation codes (OP codes), and command addresses for controlling the operations of each peripheral circuit. Interface 516 may be coupled to control logic 512 and act as a control buffer to buffer and relay control commands received from a host (not shown) to control logic 512, and to buffer and relay status information received from control logic 512 to the host. Interface 516 may further be coupled to column decoder/bit line driver 506 via data bus 518 and act as a data I/O interface and data buffer to buffer and relay data to or from memory array 301.

In a NAND type memory, the Single-Level Cell (SLC) occupies a certain share in the memory market due to its advantages of fast read and write speed, high reliability and long service life, while Multi-Level Cell (MLC), Trinary-Level Cell (TLC) and Quad-Level Cell (QLC) have become a development trend in the memory market due to its higher storage density and larger storage capacity.

However, in the related art, in order to meet specific market demands such as focusing on data reliability, memory cells with high storage density are used as memory cells with low storage density, that is, multi-level memory cells are used in downward compatibility. As an example, the Quad-Level Cell (QLC) is used as the Single-Level Cell (SLC), the Multi-Level Cell (MLC) or the Trinary-Level Cell (TLC). It is understood that each Quad-Level Cell comprises four memory bits, and during the process of performing the above scheme, some of the four memory bits are used to store valid data, and the remaining memory bits store redundant data, wherein the redundant data can be specific/fixed data, such as 1 or 0 etc., or logical operations performed on valid data. However, these redundant data are usually discarded or not fully utilized during the use of the memory.

In addition, compared with the Single-Level Cell (SLC), Multi-Level Cell (MLC) or Trinary-Level Cell (TLC), the reading window of the Quad-Level Cell is narrower, and the integrity of the valid data stored in the Quad-Level Cell still relies on hard and soft decoding of low-density parity-check codes (LDPC). Since the soft decoding adopted by the low-density parity-check codes (LDPC) performs operational iteration based on the Log-Likelihood Ratio (LLR), when the number of erroneous memory bits (that is, error bits) is higher than a certain range, it will cause the correct memory bits to be mistakenly flipped as the erroneous memory bits during the error correction, resulting in error correction failure, which in turn reduces the reading performance.

In view of one or more of the above problems, an example of the present disclosure proposes an operation method of a memory system, the memory system comprises: a memory device and a memory controller coupled to the memory device; wherein the memory device comprises a plurality of memory cells having a memory bit count of multiple bits, the memory cells comprise first type of memory bits and second type of memory bits, the first type of memory bits are used to store valid data, the second type of memory bits are used to store first type of check data, and the first type of check data is obtained by performing error correction encoding on the valid data stored in the first type of memory bits. The operation method comprises performing error correction on the valid data in which an error occurs by at least using the first type of check data in the second type of memory bits when the error occurs in reading the valid data in the first type of memory bits.

Figure 6:
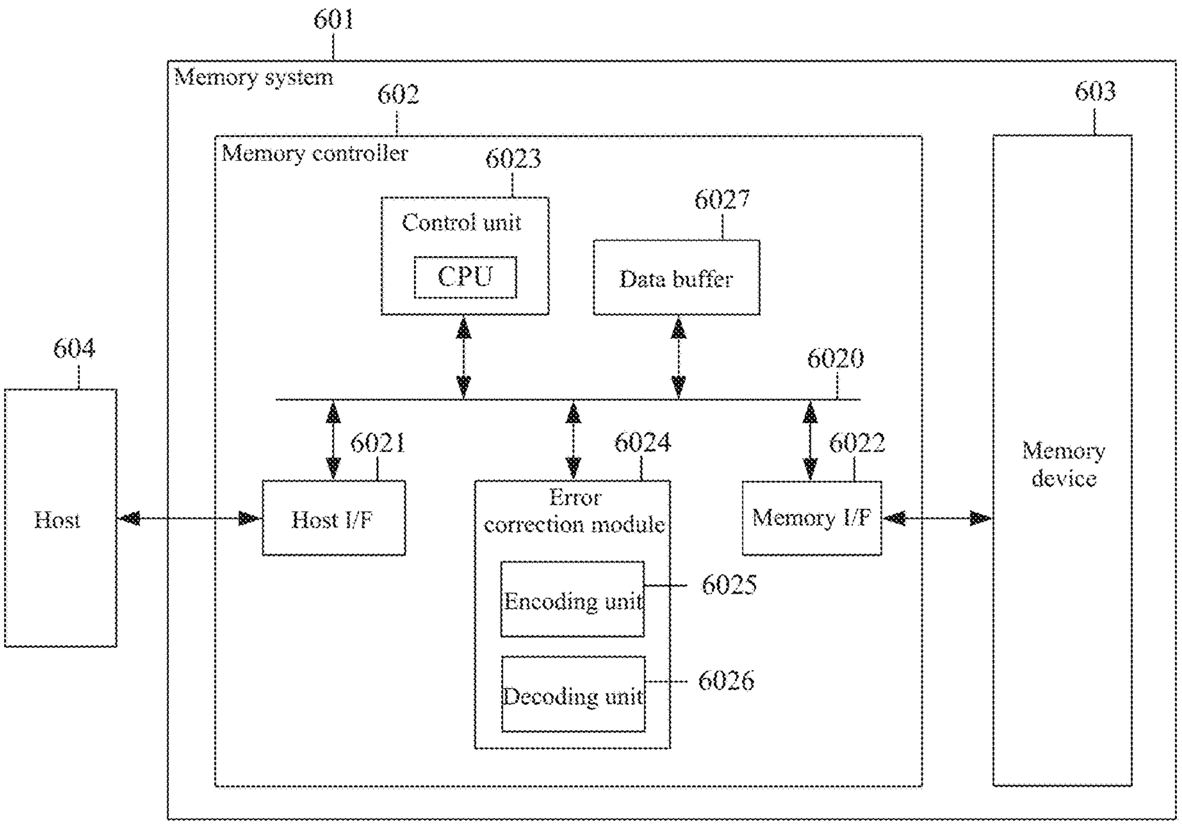
FIG. 6 is a schematic structural diagram of a memory system provided by an example of the present disclosure.

Referring to FIG. 6, a composition block diagram of a memory system is shown. The memory system 601 comprises: a memory controller 602 and a memory device 603. The memory controller 602 is used to control the memory device 603 to perform read and write operations. Here, the memory controller 602 may be coupled to the memory device 603 in any suitable manner. In the examples of the present disclosure, the memory device 603 may be a semiconductor memory for storing data in a non-volatile manner, for example, a NAND type memory. The memory system 601 is connected to a host 604, and the host 604 may be an electronic device such as a personal computer or a mobile terminal. The host I/F 6021 outputs commands, valid data (write data), and the like received from the host 604 to the internal bus 6020, and transmits the valid data (read data) read from the memory device 603, responses from a control unit 6023 and the like to the host 604.

The memory I/F 6022 controls the process of writing valid data and the like to the memory device 603 and the process of reading from the memory device 603 based on instructions from the control unit 6023. The control unit 6023 controls the memory system 601 as a whole, and the control unit 6023 is, for example, a central processing unit (CPU), a microprocessor (MPU), or the like. When receiving commands from the host 604 via the host I/F 6021, the control unit 6023 performs control according to the commands. For example, the control unit 6023 instructs the memory I/F 6022 to write valid data and parity check data into the memory device 603 according to a command from the host 604. In addition, the control unit 6023 instructs the memory I/F 6022 to read valid data and parity check data from the memory device 603 according to a command from the host 604.

The error correction (ECC) module 6024 has an encoding unit 6025 and a decoding unit 6026. The encoding unit 6025 encodes valid data of a predetermined size written in the same page to generate parity check data, such as low-density parity check codes (LDPC). The parity check data is written into the page where the valid data used as the base of encoding has been written, and the decoding unit 6026 performs decoding by using the parity check data.

The data buffer 6027 temporarily stores valid data received from the host 604 before storing it in the memory device 603, and temporarily stores data read from the memory device 603 before sending it to the host 604.

Figure 13:
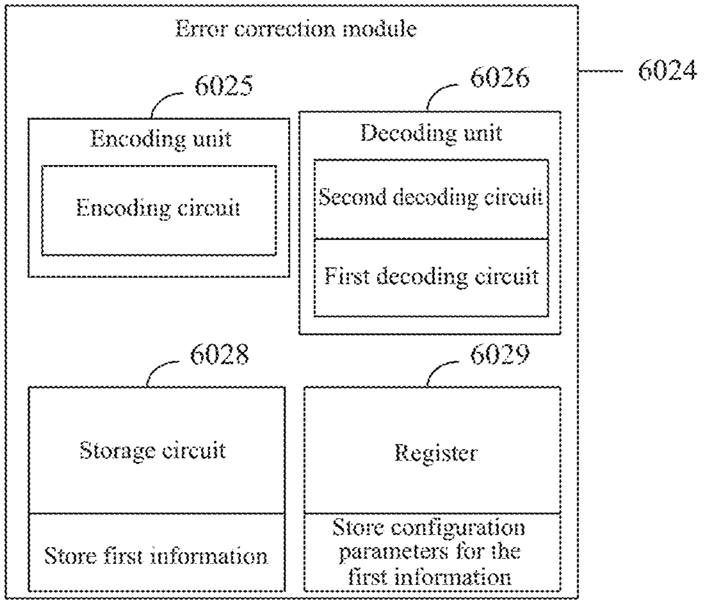
FIG. 13 is a schematic structural diagram of an error correction module provided by an example of the present disclosure.

In some examples of the present disclosure, referring to FIG. 13, the encoding unit 6025 includes an encoding circuit, and the decoding unit 6026 includes a first decoding circuit and a second decoding circuit. In addition, the error correction module 6024 also includes: a storage circuit 6028 and a register 6029. The storage circuit 6028 is used to store first information, and the register 6029 is used to store configuration parameters for the first information. The first information will be described in detail later, and will not be repeated here.

Returning to FIG. 6, the memory device 603 may include one or more memory dies, each memory die may include multiple memory planes, each memory plane may include multiple pages, each page includes multiple memory cells, each memory cell includes multiple memory bits, and the multiple memory bits can be divided into first type of memory bits and second type of memory bits. The first type of memory bits are used to store valid data, and the second type of memory bits are used to store first type of check data obtained by performing error correction encoding on the valid data stored in the first type of memory bits.

In some examples, the first type of memory bits and the second type of memory bits in the memory cells are set according to an encoding rule for storage states; wherein binary data composed of the valid data stored in the first type of memory bits and the first type of check data stored in the second type of memory bits is the same as binary data corresponding to one storage state of the memory cells. The encoding rule here include but not limited to Gray code encoding rule.

Figure 7:
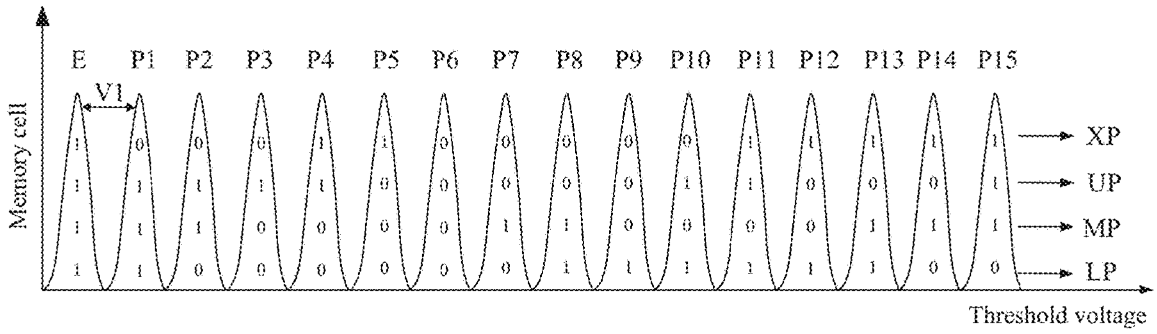
FIG. 7 is a schematic diagram of a threshold voltage distribution corresponding to 4 first type of memory bits being set in a memory cell comprising 4 memory bits provided by an example of the present disclosure.

For example, referring to FIG. 7, the memory bit count of the memory cells is four bits, and the corresponding storage states comprise a 0th state to a 15th state, which are respectively the 0th state (also called an erased state) E, a 1st state (also known as a 1st storage state) P1, a 2nd state (also known as a 2nd storage state) P2 . . . the 15th state (also known as a 15th storage state) P15. The reading margin/window between two adjacent states is a first margin V1, and binary data corresponding to the 16 states are 1111, 0111, 0110 . . . 1110 respectively. The four memory bits corresponding to the 16 states here are a first memory bit LP, a second memory bit MP, a third memory bit UP and a fourth memory bit XP.

In the examples of the present disclosure, the quad-level cell can be used as a trinary-level cell, a multi-level cell or a single-level cell. When the quad-level cell is used as a trinary-level cell, three memory bits are used to store valid data, and the memory bits for storing valid data are called first type of memory bits. The remaining memory bits in the four memory bits are called redundant memory bits, also known as second type of memory bits, and are used to store first type of check data. When the quad-level cell is used as a multi-level cell, two memory bits are used to store the valid data, and the other two memory bits are used to store the first type of check data. When the quad-level cell is used as a single-level cell, one memory bit is used to store the valid data, and the remaining three memory bits are used to store the first type of check data.

Based on this, it is necessary to select 8 states, 4 states or 2 states from the 16 states corresponding to the quad-level cell as valid data states corresponding to the trinary-level cell, multi-level cell or single-level cell, respectively. That is, it is necessary to select 3 bits, 2 bits or 1 bit from the 4 memory bits of the quad-level cell as the first type of memory bits corresponding to the trinary-level cell, multi-level cell or single-level cell for storing valid data states, respectively.

When selecting the corresponding states and selecting the corresponding memory bit, on the one hand, the spacing between the adjacent 2 states among the selected 8 states, 4 states or 2 states should be as uniform and as large as possible. It can be understood that, the larger the spacing, the larger the reading margin/window. And on the other hand, for each memory bit for the selected 8 states, 4 states or 2 states, the memory bits with a more even distribution of 1s and 0s is taken as the first type of memory bits, and the memory bits with an obviously biased distribution of 1s and 0s (there are more consecutive 1s or more consecutive 0s) is taken as the second type of memory bits. It is understood that, when the distribution of 1s and 0s is relatively even, the probability of a higher number of times of flips of 1 and 0 (it is noted that the number of times of flips refers to the transition from 1 to 0, or from 0 to 1) is generally greater, and the probability of a lower number of times of flips of 1 and 0 is generally smaller. The lower the number of times of flips, the smaller the probability of errors occurring in the reading process. In other words, the above two aspects need to be considered comprehensively when selecting the states and memory bits.

Figure 8:
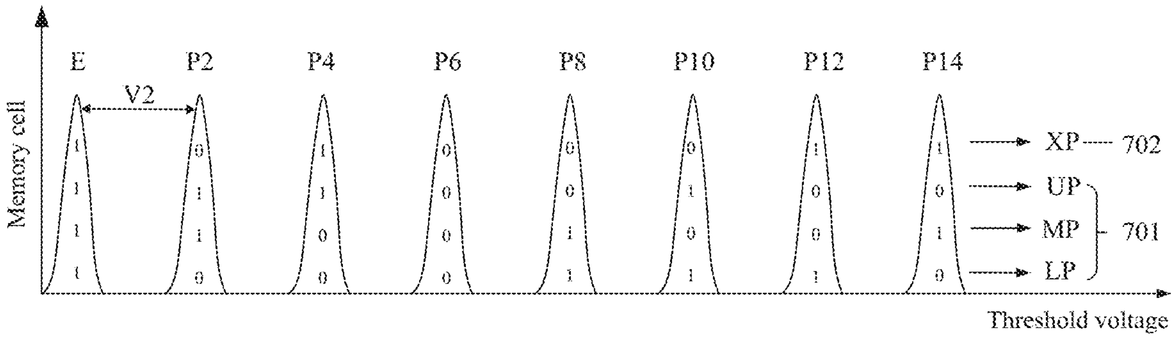
FIG. 8 is a schematic diagram of a threshold voltage distribution corresponding to 3 first type of memory bits being set in a memory cell comprising 4 memory bits provided by an example of the present disclosure.

For example, referring to FIG. 8, when the quad-level cell is used as a trinary-level cell, the valid data is stored in the first memory bit LP, the second memory bit MP, and the third memory bit UP, and the first type of check data is stored in the fourth memory bit XP. The four binary data composed of the valid data stored in the first type of memory bits and the first type of check data stored in the second type of memory bits are respectively the same as binary data corresponding to the 0th state E, the 2nd state P2, the 4th state P4, the 6th state P6, the 8th state P8, the 10th state P10, the 12th state P12 and the 14th state P14.

In addition, with reference to FIG. 7 and FIG. 8, when the quad-level cell is used as a trinary-level cell, the number of times of flips between 1 and 0 in the first memory bit LP, the second memory bit MP and the fourth memory bit XP of the trinary-level cell is the same as the number of times of flips between 1 and 0 in the first memory bit LP of the quad-level cell, whereas the number of times of flips between 1 and 0 corresponding to the third memory bit UP of the trinary-level cell are reduced from 4 to 3 times as compared to the number of times of flips between 1 and 0 in the third memory bit UP of the quad-level cell. That is, for the case from QLC to TLC, the number of reading windows for the third memory bit UP to generate errors is reduced from 4 to 3, and the number of reading windows for the first memory bit LP/second memory bit MP/fourth memory bit XP to generate errors remain unchanged. Here, the reading margin/window between two adjacent states is a second margin V2, and the second margin V2 is greater than the first margin V1.

Figure 9:
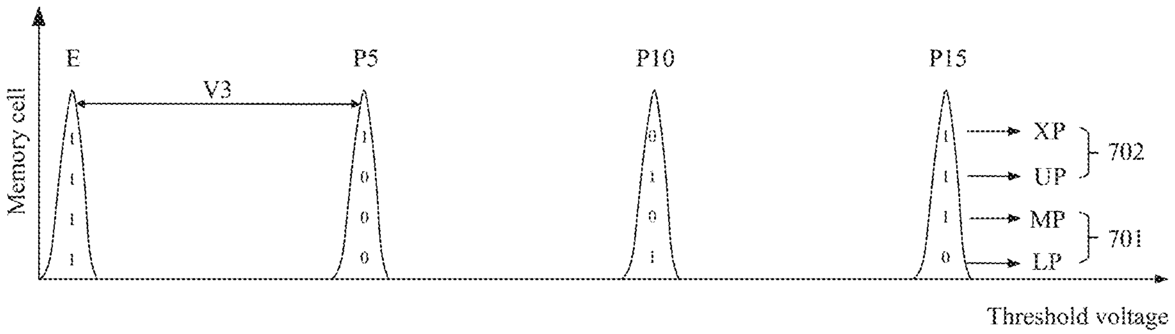
FIG. 9 is a schematic diagram of a threshold voltage distribution corresponding to 2 first type of memory bits being set in a memory cell comprising 4 memory bits provided by an example of the present disclosure.

In some examples, referring to FIG. 9, when the quad-level cell is used as a multi-level cell, the valid data is stored in the first memory bit LP and the second memory bit MP, and the first type of check data is stored in the third memory bit UP and the fourth memory bit XP. Four binary data composed of the valid data stored in the first type of memory bits and the first type of check data stored in the second type of memory bits are respectively the same as binary data corresponding to the 0th state E, the 5th state P5, the 10th state P10 and the 15th state P15. At the same time, for each memory bit for the selected 4 states, the corresponding 4 binary data in the first memory bit LP are respectively 1, 0, 1, 0 in sequence, the corresponding 4 binary data in the second memory bit MP are respectively 1, 0, 0, 1 in sequence, the corresponding 4 binary data in the third memory bit UP are respectively 1, 0, 1, 1 in sequence, and the corresponding 4 binary data in the fourth memory bit XP are respectively 1, 1, 0, 1 in sequence. At this time, the first memory bit LP and the second memory bit MP with a more even distribution of 1s and 0s are used as the first type of memory bits, and the third memory bits UP and the fourth memory bit XP with an obviously biased distribution of 1s and 0s (more 1s) are used as the second type of memory bits.

With reference to FIG. 9, when the quad-level cell is used as a multi-level cell, the number of times of flips between 1 and 0 in the first memory bit LP of the multi-level cell is the same as that in the first memory bit LP of the quad-level cell, whereas the number of times of flips between 1 and 0 corresponding to the second memory bit MP, the third memory bit UP and the fourth memory bit XP of the multi-level cell are all reduced from 4 to 2 times. That is, for the case from QLC to MLC, the number of reading windows for the second memory bit MP, the third memory bit UP and the fourth memory bit XP to generate errors are all reduced from 4 to 2, and the number of reading windows for the first memory bit LP to generate errors remains unchanged. Here, the reading margin/window between two adjacent states is a third margin V3, and the third margin V3 is greater than the first margin V1.

Figure 10:
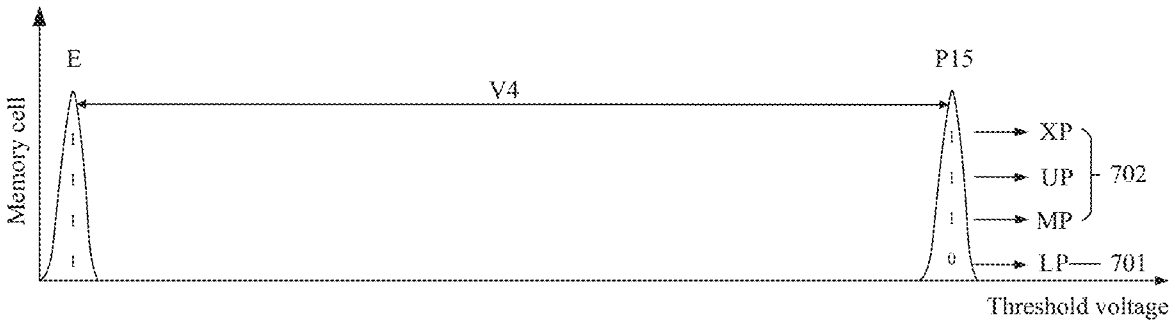
FIG. 10 is a schematic diagram of the corresponding relationship between the third and fourth memory bit and the first and second memory bit respectively provided by an example of the present disclosure.

In some other examples, referring to FIG. 10, when the quad-level cell is used as a single-level cell, the valid data is stored in the first memory bit LP, and the first type of check data is stored in the second memory bit MP, the third memory bit UP and the fourth memory bit XP. The four binary data composed of the valid data stored in the first type of memory bits and the first type of check data stored in the second type of memory bits are the same as binary data corresponding to the 0th state E and 15th state P15. It is noted that the four binary data composed of the valid data stored in the first type of memory bits and the first type of check data stored in the second type of memory bits can also be the same as binary data corresponding to other states, for example, the 0th state and the 8th state P8.

Referring to FIG. 10, when the quad-level cell is used as a single-level cell, the number of times of flips between 1 and 0 in the first memory bit LP of the single-level cell is reduced from 3 to 1 time, and the number of times of flips between 1 and 0 corresponding to the second memory bit MP, the third memory bit UP, and the fourth memory bit XP of the single-level cell are all reduced from 4 to 0. That is, for the case from QLC to SLC, the number of reading windows for the first memory bit LP to generate errors are all reduced from 3 to 1, and the number of reading windows for the second memory bit MP, the third memory bit UP and the fourth memory bit XP to generate errors are all reduced from 4 to 0. Here, the reading margin/window between two adjacent states is a fourth margin V4, and the fourth margin V4 is greater than the first margin V1.

It is understood that when the multi-level memory cells are used in downward compatibility, the range of a single reading window is widened due to the reduction of the number of the distributions of threshold voltage (Vt), and the number of reading windows that generate error bits is reduced due to the reduction of the number of the distributions of threshold voltage (Vt). At the same time, in practical applications, error bits are gradually generated with the usage of the memory system (the system side sees more problems of retention or read disturb), check errors (UNC, called also ECC error) may initially appear only on a certain page in LP/MP/UP/XP (based on the aforementioned two facts that the range of the single reading window is widened and the number of reading windows that generate error bits is reduced, the probability of Unable-Correction (UNC) for a single page is higher than normal QLC), and there may be a relatively high number of errors on other pages, but it can still be successfully corrected by LDPC. If refresh is not made at this time, other pages may become UNC as the error bits on the other pages slowly grow. Based on this, redundant data can be used as a kind of check data when the multi-level memory cells are used in downward compatibility.

For example, when the quad-level cell is used as a trinary-level cell, the valid data can be stored in the first memory bit LP, the second memory bit MP, and the third memory bit UP after the eight states corresponding to the trinary-level cell are determined, depending on actual needs. Moreover, binary data composed of the valid data stored in the first type of memory bits and the first type of check data stored in the second type of memory bits is the same as binary data corresponding to one storage state of the memory cells. At this time, the first type of check data stored in the fourth memory bit XP is also a determined value. In this case, the correspondence between the fourth memory bit and the first memory bit LP, the second memory bit MP, the third memory bit UP can be determined according to derivation.

Specifically, it can be known from the derivation that the fourth memory bit XP is obtained by the exclusive OR operation of the first memory bit LP, the second memory bit MP and the third memory bit UP (the operator of the exclusive OR operation is XOR), and the corresponding formula is: XP=UP XOR MP XOR LP.

It is noted that the XOR operation is one of the basic logical operations. In binary, if two binary numbers at the same position are the same, the result is "0", and if two binary numbers at the same position are different, the result is "1" (that is, 0 for the same, and 1 for the difference). Here, the different states corresponding to each memory bit need to be operated separately.

For example, when the quad-level cell is used as a multi-level cell, the valid data can be stored in the first memory bit LP and the second memory bit MP after the four states corresponding to the multi-level cell are determined, depending on actual needs. Moreover, binary data composed of the valid data stored in the first type of memory bits and the first type of check data stored in the second type of memory bits is the same as binary data corresponding to one storage state of the memory cells. At this time, the data stored in the third memory bit UP and the fourth memory bit XP are also determined values. In this case, the correspondence between the third memory bit UP, the fourth memory bit and the first memory bit LP, the second memory bit MP can be determined respectively according to derivation.

Figures 11, 12A, 12B:
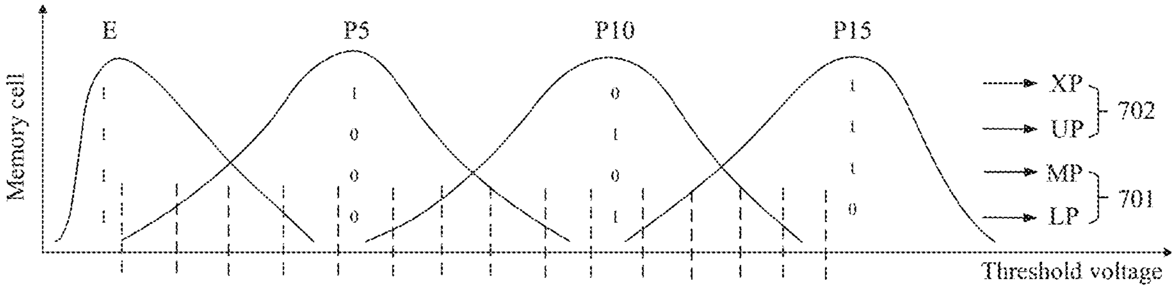
FIG. 11 is a schematic diagram of a threshold voltage distribution corresponding to 1 first type of memory bit being set in a memory cell comprising 4 memory bits provided by an example of the present disclosure.
FIG. 12*a* is a schematic diagram of threshold voltage distribution corresponding to 2 first type of memory bits being set in another memory cell comprising 4 memory bits provided by an example of the present disclosure.
FIG. 12*b* is a schematic diagram of a probability mapping table corresponding to FIG. 12*a* provided by an example of the present disclosure.

Specifically, referring to FIG. 11, it can be known from the derivation that the third memory bit UP is obtained by the OR operation of the first memory bit LP and the second memory bit MP (the operator of the OR operation is represented by "OR" or "||"), and the corresponding formula is: UP=LP OR MP. The fourth memory bit XP can be obtained by flipping the first memory bit LP, and then ORing with the second memory bit MP, and the corresponding formula is: XP=(~LP) OR MP. Here, the different states corresponding to each memory bit need to be operated separately.

It is to be noted that the OR operation, also known as logical OR, is one of the basic logical operations. In binary, for two binary numbers in the same position, if there is "1", the result is "1", otherwise it is "0" (i.e., 1 for any 1, 0 for all 0s).

For example, when the quad-level cell is used as a single-level cell, the valid data can be stored in the first memory bit LP after the two states corresponding to the single-level cell are determined, depending on actual needs. Moreover, binary data composed of the valid data stored in the first type of memory bits and the first type of check data stored in the second type of memory bits is the same as binary data corresponding to one storage state of the memory cells. At this time, the first type of check data stored in second memory bit MP, the third memory bit UP and the fourth memory bit XP are also determined values. In this case, the correspondence between the second memory bit MP, the third memory bit UP, the fourth memory bit XP and the first memory bit LP can be determined respectively according to derivation.

It is to be noted that, since only the first memory bit LP in the single-level cell stores the valid data, there are many formulas between the first memory bit LP and the second memory bit MP, the third memory bit UP, the fourth memory bit XP respectively, which will not be repeated here.

Based on this, with reference to FIG. 8, FIG. 9, FIG. 10, and FIG. 11, after determining the multiple states of different levels of memory cells, the data stored in the first type of memory bits 701 and the second type of memory bits 702 of each memory cell is also determined, and there is a relationship deduced as above between the valid data stored in the first type of memory bits 701 and the first type of check data stored in the second type of memory bits 702. In other words, when an error occurs in reading valid data stored in the first type of memory bits 701, the first type of check data in the second type of memory bits 702 can be utilized to perform error correction on the valid data in which the error occurs (that is, by the formulas in the above examples).

Figure 14:
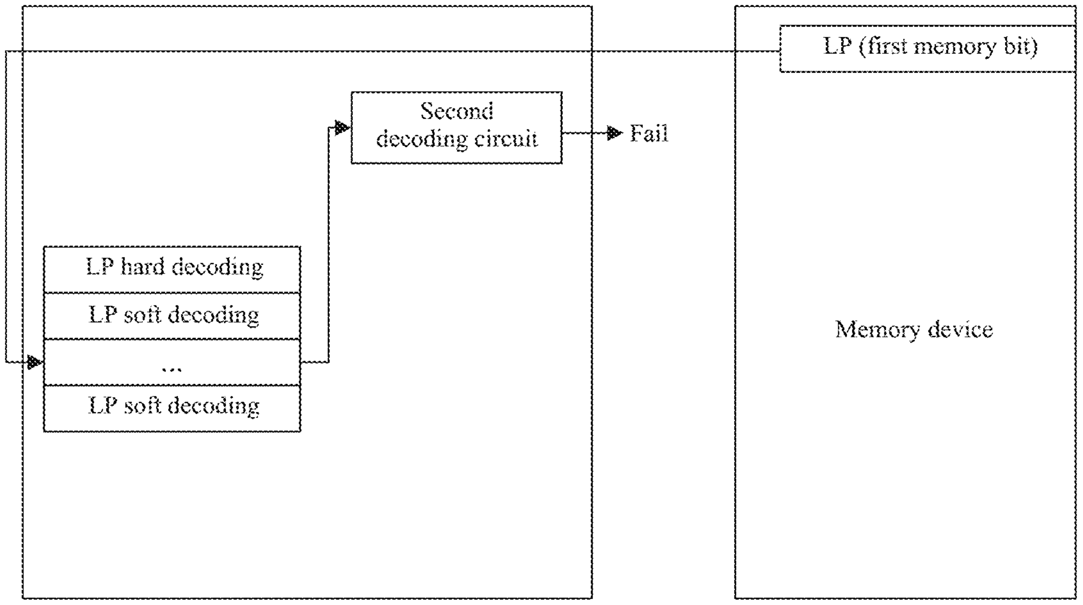
FIG. 14 is a schematic diagram of an error correction process for a first memory bit provided by an example of the present disclosure.

It is to be noted that, referring to FIG. 14, before performing the error correcting on the valid data in which the error occurs in the first type of memory bits by using the first type of check data in the second type of memory bits, a second type of check data can be used to perform the error correcting on the erroneous valid data in the first type of memory bits. Based on this, in some examples, the method further comprises performing error correction encoding on the valid data stored in the plurality of the memory cells to obtain the second type of check data. It is noted that, in the related art, the operation of obtaining the second type of check data by using the valid data stored in the memory cell is relatively mature, and will not be repeated here.

It should be noted that in the conventional error correction process, the error correction is mainly performed on the erroneous valid data in the first type of memory bits by using the second type of check data. After performing the error correction on the erroneous valid data in the first type of memory bits by using the second type of check data, if the erroneous valid data in the first type of memory bits cannot be completely corrected by using the second type of check data, the error correction is performed on the erroneous valid data in the first type of memory bits by using the first type of check data as in the above-mentioned examples of the present disclosure at this time. In other words, the error-correction scheme disclosed in the various examples of the present disclosure is a supplement to error correction scheme for performing the error correction on the erroneous valid data in the first type of memory bits by using the second type of check data for the purpose of further improving the error correction capability of the system. In addition, after performing correcting the erroneous valid data in the first type of memory bits by using the first type of check data as in the above-mentioned examples of the present disclosure, if the erroneous valid data in the first type of memory bits still cannot be completely corrected, the error correction is performed on the valid data that is still erroneous in the first type of memory bits by using the second type of check data.

Here, the first type of check data is formed by using redundant data in the memory cells, and the second type of check data is formed by correct valid data stored in the memory cells.

The second type of check data includes but is not limited to low-density parity check codes (LDPC). The decoding method of LDPC includes hard decision decoding (also known as hard decoding) and soft decision decoding (also known as soft decoding). In the hard decoding, information may be transferred between a check node and a variable node to iterate until all parity checks return to 0, then the decoding is successful; and if the hard decoding is unsuccessful, continue to use the soft decoding. In the soft decoding, the probability that the memory bit is 1 or 0 is determined according to the reading results by adjusting different reading voltages, and finally the success of decoding is achieved according to the probability of 1 or 0. However, in some examples, there may be cases where the decoding is still unsuccessful after the soft decoding operation.

Based on this, in some specific examples, performing the error correction on the valid data in which the error occurs by at least using the first type of check data in the second type of memory bits when the error occurs in reading the valid data in the first type of memory bits comprises: reading data stored in all remaining memory bits of the memory cells except a first memory bit when decoding of the valid data stored in the first memory bit by using a second type of check data fails; wherein the first memory bit being one of the first type of memory bits; generating first information for data stored in all memory bits of the memory cells when data stored in all the remaining memory bits of the memory cells are decoded normally; wherein the first information being used to characterize a probability of an error occurring in the valid data in the first memory bit of the memory cells; and performing the error correction on the valid data in the first memory bit by using the first information.

For example, a multi-level cell is taken as an example. Referring to FIG. 12*a* and FIG. 12*b*, when an error occurs in the valid data in the first memory bit LP, error correction is performed on the valid data in the first memory bit LP by the LDPC decoding method. If the soft decoding still fails, the second memory bit MP, the third memory bit UP and the fourth memory bit XP in the memory cell are read. When the data stored in the second memory bit MP, the third memory bit UP and the fourth memory bit XP are all read normally, the valid data stored in the second memory bit MP and the first type of check data stored in the third memory bit UP and the fourth memory bit XP are utilized to generate first information for the data stored in all memory bits of the memory cell. The first information may be, for example, a Vector P.

It is noted that, if a reading failure occurs in the process of reading the second memory bit MP, the third memory bit UP and the fourth memory bit XP, the decoding method of LDPC or the error correction code (ECC) is used to perform error correction on the memory bit until all the data of the second memory bit MP, the third memory bit UP and the fourth memory bit XP are successfully read. In addition, as mentioned above, since the number of times of flips between 1 and 0 in the second memory bit MP, the third memory bit UP and the fourth memory bit XP is relatively small, the probability that the error occurs in reading the second memory bit MP, the third memory bit UP and the fourth memory bit XP is lower. In view of this, when the reading failure occurs in the second memory bit MP, the third memory bit UP and the fourth memory bit XP, LDPC decoding method or error correction code (ECC) may be used to perform error correction on it.

In some examples, generating the first information for the data stored in all the memory bits of the memory cells comprises: generating the first information by using the data stored in all the remaining memory bits in combination with a probability mapping table; wherein the probability mapping table comprising a probability of an error occurring in data in the first memory bit in a case that all kinds of data stored in all the remaining memory bits corresponds to the first memory bit storing different data.

Referring to FIG. 12*b*, a schematic diagram of a probability mapping table corresponding to a multi-level cell is shown. The probability mapping table is obtained according to the error correction encoding rule. The probability mapping table includes the data stored in the first memory bit LP, the second memory bit MP, the third memory bit UP and the fourth memory bit XP, error data corresponding to the first memory bit LP, and the first information corresponding to whether the first memory bit LP is an error bit. It can be seen from the first information the probability R of an error occurs in the valid data stored in the first memory bit.

Specifically, except for the first memory bit LP, the data stored in all remaining memory bits may be the same or different. Referring to FIG. 12*a*, among the four states, the data in the erased state E and the 15th state P15 are the same, which is 111. Therefore, there are only three kinds of non-repetitive data corresponding to the four states of the multi-level cell, that is 111, 001, 010. In addition, the data in the first memory bit LP may be 1 or 0. Therefore, the probability mapping corresponding to the multi-level cell shown in FIG. 12*b* includes 6 kinds of data.

In some examples, when the first information is a first value, it is characterized that a probability R of an error occurring in the valid data in the first memory bit in a corresponding data case is 0%; when the first information is a second value, it is characterized that the probability R of an error occurring in the valid data in the first memory bit in the corresponding data case is 100%; and when the first information is a third value, it is characterized that the probability R of an error occurring in the valid data in the first memory bit in the corresponding data case is: 0%<R<100%.

For example, referring to FIG. 12*a* and FIG. 12*b*, among the four states corresponding to the multi-level cell, when the data stored in the second memory bit MP, the third memory bit UP and the fourth memory bit XP are all 1 (correct data), the data of the corresponding first memory bit LP may be 1 or 0. When the data of the first memory bit LP is 1, the storage state is the erased state E, and the data of the first memory bit LP is 0, the storage state is the 15th state P15. Therefore, the probability R of an error occurring in the valid data in the first memory bit LP is 50%, and the first information is the third value at this time.

For example, referring to FIG. 12*a* and FIG. 12*b*, when the data stored in the second memory bit MP and the third memory bit UP are all 0, and the data stored in the fourth memory bit XP are all 1, the storage state is the fifth state P5 if the data of the corresponding first memory bit LP is 0. At this time, the probability R of an error occurring in the valid data in the first memory bit LP is 0%, and the first information is the first value. When the data stored in the second memory bit MP and the third memory bit UP are all 0, and the data stored in the fourth memory bit XP are all 1, the storage state is not any one of the above four states (E, P5, P10, P15) if the data of the corresponding first memory bit LP is 1. At this time, the first memory bit LP is an error bit, the probability R of an error occurring in the valid data in the first memory bit LP is 100%, and the first information is the second value.

For example, referring to FIG. 12*a* and FIG. 12*b*, when the data stored in the second memory bit MP are all 0, the data stored in the third memory bit UP are all 1, and the data stored in the fourth memory bit XP are all 0, the storage state is the tenth state P10 if the data of the corresponding first memory bit LP is 1. At this time, the probability R of an error occurring in the valid data in the first memory bit LP is 0%. At this time, the first information is the first value. When the data stored in the second memory bit MP are all 0, the data stored in the third memory bit UP are all 1, and the data stored in the fourth memory bit XP are all 0, the storage state is not any one of the above four states (E, P5, P10, P15) if the data of the corresponding first memory bit LP is 0. At this time, the first memory bit LP is an error bit, and the probability R of an error occurring in the valid data in the first memory bit LP is 100%. At this time, the first information is the second value.

Based on this, when the data stored in the second memory bit MP, the third memory bit UP and the fourth memory bit XP are all decoded normally, the first information can be used to perform error correction on the valid data in the first memory bit LP to improve the error correction capability of the system.

In some examples, the method further comprises flipping the valid data in the first memory bit in the corresponding data case when the first information is the second value.

Specifically, when the first information is the second value, it is indicated that the first memory bit LP is an error bit. At this time, the valid data in the first memory bit LP is flipped such that the data stored in the first memory bit LP is transformed into correct data.

For example, referring to FIG. 12*b*, when the data stored in the second memory bit MP and the third memory bit UP are all 0, and the data stored in the fourth memory bit XP are all 1, the data of the first memory bit LP is flipped if the data of the corresponding first memory bit LP is 1, and the flipped data of the first memory bit LP is 0. At this time, binary data (0001) corresponds to the fifth state P5 among the four states, and the first information is accordingly converted from the second value to the first value.

In the above-mentioned example, after performing the error correction on the valid data in which an error occurs by using the first type of check data in the second type of memory bits, the probability R of the error still existing in the first memory bit LP is: 0%<R<100% (for example, 50%). Based on this, in some examples, the method further comprises decoding the valid data which is error-corrected in the first memory bit by using the second type of check data. The decoding method includes but not limited to hard decoding and soft decoding, and the specific operations corresponding to the hard decoding and soft decoding have been mentioned above, and will not be repeated here. In this way, the error rate of valid data stored in the first memory bit LP can be further reduced, and the error correction capability of the system can be improved.

Based on this, in the example of the present disclosure, multiple memory bits in the same memory cell are set as the first type of memory bits and the second type of memory bits, valid data is stored in the first type of memory bits, and the first type of check data corresponding to the valid data is stored in the second type of memory bits. In this way, the error correction is performed on the valid data in which an error occurs by using the first type of check data in the second type of memory bits when the error occurs in reading the valid data, thereby improving the reading performance of the memory system.

On the other hand, an example of the present disclosure provides a memory system, and the memory system comprises: a memory device and a memory controller coupled to the memory device; wherein, the memory device comprises a plurality of memory cells having a memory bit count of multiple bits, the memory cells comprise first type of memory bits and second type of memory bits, the first type of memory bits are used to store valid data, the second type of memory bits are used to store first type of check data, and the first type of check data is obtained by performing error correction encoding on the valid data stored in the first type of memory bits; the memory controller is configured to: perform error correction on the valid data in which an error occurs by at least using the first type of check data in the second type of memory bits when the error occurs in reading the valid data in the first type of memory bits.

Figure 15:
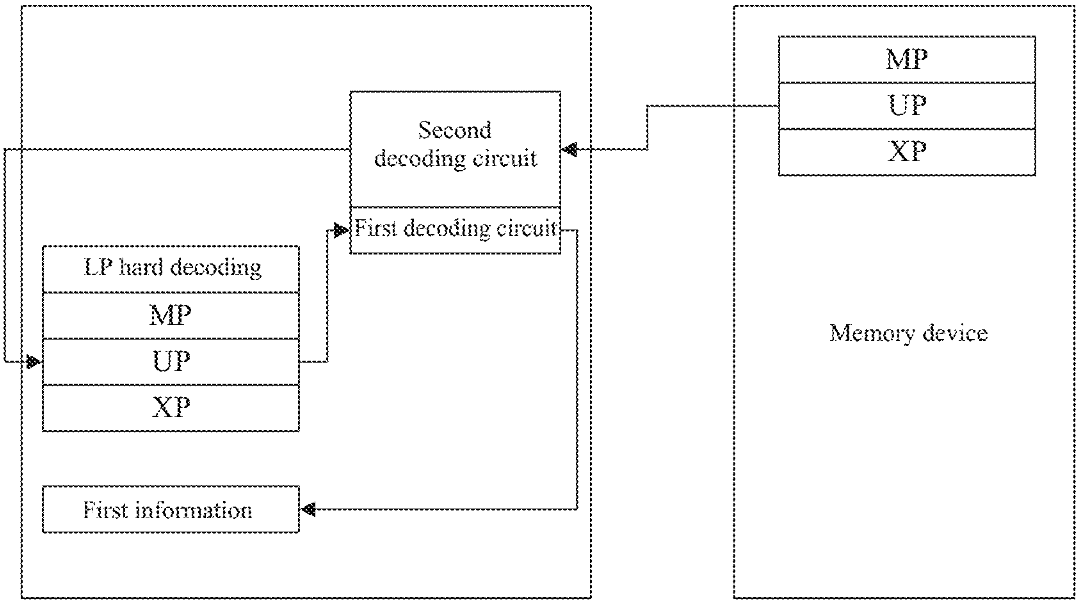
FIG. 15 is a schematic diagram of an error correction process for a first memory bit provided by another example of the present disclosure.

In some examples, referring to FIG. 14 and FIG. 15, the memory controller is configured to: read data stored in all remaining memory bits (MP, UP. XP) of the memory cells except a first memory bit when decoding (LP hard decoding and LP soft decoding) of the valid data stored in the first memory bit by using a second type of check data fails; wherein the first memory bit being one of the first type of memory bits; generate first information for data stored in all memory bits of the memory cells when data stored in all the remaining memory bits of the memory cells are decoded normally; wherein the first information being used to characterize a probability of an error occurring in the valid data in the first memory bit of the memory cells; and perform the error correction on the valid data in the first memory bit by using the first information.

Figure 16:
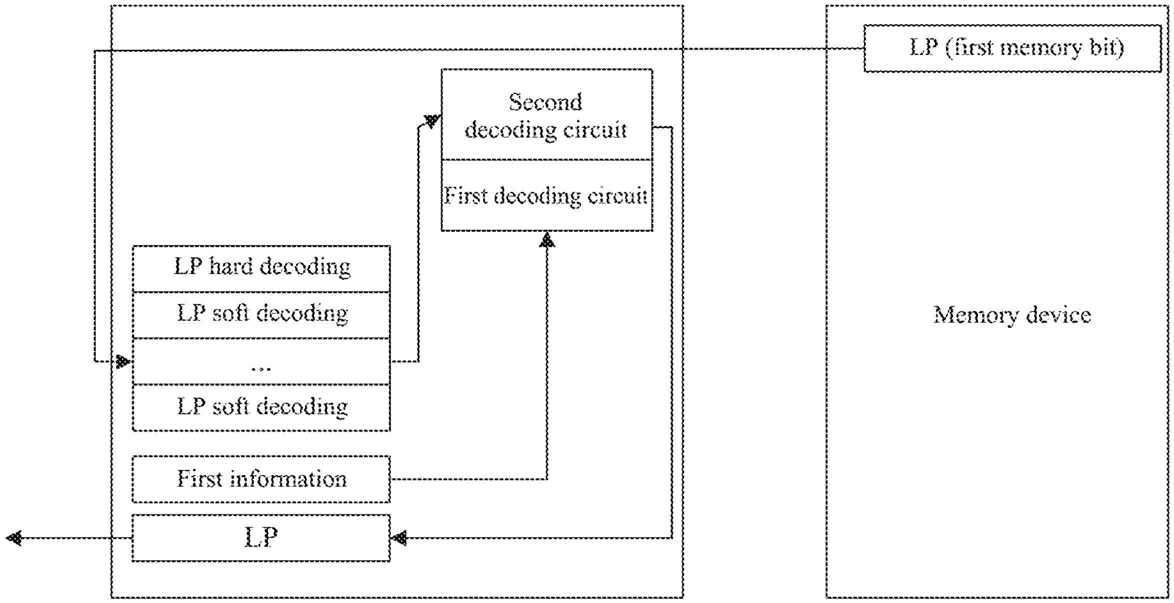
FIG. 16 is a schematic diagram of an error correction process for a first memory bit provided by a further example of the present disclosure.

In some examples, referring to FIG. 16, the memory controller is configured to: decode (LP hard decode and LP soft decode) the valid data which is error-corrected in the first memory bit by using the second type of check data.

In some examples, referring to FIG. 13 and FIG. 15, the error correction module 6024 further includes: a first decoding circuit, a storage circuit 6028 and a register 6029; wherein, the register 6029 is configured to: at least store a probability mapping table, the probability mapping table comprising a probability of an error occurring in data in the first memory bit in a case that all kinds of data stored in all the remaining memory bits corresponds to the first memory bit storing different data; the first decoding circuit is configured to: generate the first information by using the data stored in all the remaining memory bits (MP. UP, XP) in combination with the probability mapping table; and the storage circuit 6028 is configured to: store the first information.

In some examples, when the first information is a first value, it is characterized that a probability R of an error occurring in the valid data in the first memory bit in a corresponding data case is 0%; when the first information is a second value, it is characterized that the probability R of an error occurring in the valid data in the first memory bit in the corresponding data case is 100%; and when the first information is a third value, it is characterized that the probability R of an error occurring in the valid data in the first memory bit in the corresponding data case is: $0\%<R<100\%$.

In some examples, the first decoding circuit is further configured to: flip the valid data in the first memory bit in the corresponding data case when the first information is the second value.

In some examples, referring to FIG. 13 and FIG. 14, the encoding unit 6025 comprises: an encoding circuit, and the decoding unit 6026 further comprises: a second decoding circuit; wherein the encoding circuit is configured to: perform error correction encoding on the valid data stored in the plurality of the memory cells to obtain the second type of check data;

the second decoding circuit is configured to: decode (LP hard decode and LP soft decode) the valid data stored in the memory cells by using the second type of check data.

In some examples, the second type of check data comprises low-density parity check codes (LDPC).

In some examples, the first type of memory bits and the second type of memory bits in the memory cells are set according to an encoding rule for storage states; wherein binary data composed of the valid data stored in the first type of memory bits and the first type of check data stored in the second type of memory bits is the same as binary data corresponding to one storage state of the memory cells.

In some examples, the memory bit count of the memory cells is four bits, the storage states comprise a 0th state to a 15th state, both the first type of memory bits and the second type of memory bits comprise two bits, and four binary data composed of the valid data stored in the first type of memory bits and the first type of check data stored in the second type of memory bits are the same as binary data corresponding to the 0th state, a 5th state, a 10th state and the 15th state respectively.

In some examples, the memory system comprises a universal flash storage (UFS) device or a solid state disk, and the memory device comprises a NAND type memory.

It should be understood that reference throughout the specification to "one example" or "an example" means that a particular feature, structure or characteristic related to the example is included in at least one example of the present disclosure. Thus, appearances of "in one example" or "in an example" in various places throughout the specification are not necessarily referring to the same example. Furthermore, these particular features, structures or characteristics may be combined in any suitable manner in one or more examples. It should be understood that in various examples of the present disclosure, the sequence numbers of the above-mentioned processes do not mean the order of execution, and the execution order of the processes should be determined by their functions and inherent logic, rather than limiting implementation process of the examples of the present disclosure. The sequence numbers of the above-mentioned examples of the present disclosure are for description only, and do not represent the advantages and disadvantages of the examples.

The methods disclosed in the several method examples provided in the present disclosure can be combined arbitrarily to obtain new method examples if there is no conflict.

Based on this, on the one hand, an example of the present disclosure provides a memory system, the memory system comprises: a memory device and a memory controller coupled to the memory device; wherein, the memory device comprises a plurality of memory cells having a memory bit count of multiple bits, the memory cells comprise first type of memory bits and second type of memory bits, the first type of memory bits are used to store valid data, the second type of memory bits are used to store first type of check data, and the first type of check data is obtained by performing error correction encoding on the valid data stored in the first type of memory bits; and the memory controller is configured to: perform error correction on the valid data in which an error occurs by at least using the first type of check data in the second type of memory bits when the error occurs in reading the valid data in the first type of memory bits.

In the above solution, the memory controller is configured to: read data stored in all remaining memory bits of the memory cells except a first memory bit when decoding of the valid data stored in the first memory bit by using a second type of check data fails; wherein the first memory bit being one of the first type of memory bits; generate first information for data stored in all memory bits of the memory cells when data stored in all the remaining memory bits of the memory cells are decoded normally; wherein the first information being used to characterize a probability of an error occurring in the valid data in the first memory bit of the memory cells; and perform the error correction on the valid data in the first memory bit by using the first information.

In the above solution, the memory controller is configured to: decode the valid data which is error-corrected in the first memory bit by using the second type of check data.

In the above solution, the memory controller comprises: an error correction module, the error correction module at least comprising: a first decoding circuit, a storage circuit and a register; wherein, the register being configured to: at least store a probability mapping table, the probability mapping table comprising a probability of an error occurring in data in the first memory bit in a case that all kinds of data stored in all the remaining memory bits corresponds to the first memory bit storing different data; the first decoding circuit being configured to: generate the first information by using the data stored in all the remaining memory bits in combination with the probability mapping table; and the storage circuit being configured to: store the first information.

In the above solution, when the first information is a first value, it is characterized that a probability R of an error occurring in the valid data in the first memory bit in a corresponding data case is 0%; when the first information is a second value, it is characterized that the probability R of an error occurring in the valid data in the first memory bit in the corresponding data case is 100%; and when the first information is a third value, it is characterized that the probability R of an error occurring in the valid data in the first memory bit in the corresponding data case is: $0\%<R<100\%$.

In the above solution, the first decoding circuit is further configured to: flip the valid data in the first memory bit in the corresponding data case when the first information is the second value.

In the above solution, the error correction module further comprises: an encoding circuit and a second decoding circuit; wherein, the encoding circuit being configured to: perform error correction encoding on the valid data stored in the plurality of the memory cells to obtain the second type of check data; and the second decoding circuit being configured to: decode the valid data stored in the memory cells by using the second type of check data.

In the above solution, the second type of check data comprises low-density parity check codes (LDPC).

In the above solution, the first type of memory bits and the second type of memory bits in the memory cells are set according to an encoding rule for storage states; wherein binary data composed of the valid data stored in the first type of memory bits and the first type of check data stored in the second type of memory bits is the same as binary data corresponding to one storage state of the memory cells.

In the above solution, the memory bit count of the memory cells is four bits, the storage states comprise a 0th state to a 15th state, both the first type of memory bits and the second type of memory bits comprise two bits, and four binary data composed of the valid data stored in the first type of memory bits and the first type of check data stored in the second type of memory bits are the same as binary data corresponding to the 0th state, a 5th state, a 10th state and the 15th state respectively.

In the above solution, the memory system comprises a solid state disk, and the memory device comprises a NAND type memory.

On the other hand, an example of the present disclosure provides an operation method for a memory system, characterized in that the memory system comprises: a memory device and a memory controller coupled to the memory device; wherein, the memory device comprises a plurality of memory cells having a memory bit count of multiple bits, the memory cells comprise first type of memory bits and second type of memory bits, the first type of memory bits are used to store valid data, the second type of memory bits are used to store first type of check data, and the first type of check data is obtained by performing error correction encoding on the valid data stored in the first type of memory bits; and the operation method comprises: performing error correction on the valid data in which an error occurs by at least using the first type of check data in the second type of memory bits when the error occurs in reading the valid data in the first type of memory bits.

In the above solution, performing the error correction on the valid data in which the error occurs by at least using the first type of check data in the second type of memory bits when the error occurs in reading the valid data in the first type of memory bits comprises: reading data stored in all remaining memory bits of the memory cells except a first memory bit when decoding of the valid data stored in the first memory bit by using a second type of check data fails; wherein the first memory bit being one of the first type of memory bits; generating first information for data stored in all memory bits of the memory cells when data stored in all the remaining memory bits of the memory cells are decoded normally; wherein the first information being used to characterize a probability of an error occurring in the valid data in the first memory bit of the memory cells; and performing the error correction on the valid data in the first memory bit by using the first information.

In the above solution, the method further comprises decoding the valid data which is error-corrected in the first memory bit by using the second type of check data.

In the above solution, generating the first information for the data stored in all the memory bits of the memory cells comprises: generating the first information by using the data stored in all the remaining memory bits in combination with a probability mapping table; wherein the probability mapping table comprising a probability of an error occurring in data in the first memory bit in a case that all kinds of data stored in all the remaining memory bits corresponds to the first memory bit storing different data.

In the above solution, when the first information is a first value, it is characterized that a probability R of an error occurring in the valid data in the first memory bit in a corresponding data case is 0%; when the first information is a second value, it is characterized that the probability R of an error occurring in the valid data in the first memory bit in the corresponding data case is 100%; and when the first information is a third value, it is characterized that the probability R of an error occurring in the valid data in the first memory bit in the corresponding data case is: $0\%<R<100\%$.

In the above solution, the method further comprises flipping the valid data in the first memory bit in the corresponding data case when the first information is the second value.

In the above solution, the method further comprises performing error correction encoding on the valid data stored in the plurality of the memory cells to obtain the second type of check data.

In the above solution, the second type of check data comprises LDPC.

In the above solution, the first type of memory bits and the second type of memory bits in the memory cells are set according to an encoding rule for storage states; wherein binary data composed of the valid data stored in the first type of memory bits and the first type of check data stored in the second type of memory bits is the same as binary data corresponding to one storage state of the memory cells In an example of the present disclosure, a memory system comprises: a memory device and a memory controller coupled to the memory device; wherein, the memory device comprises a plurality of memory cells having a memory bit count of multiple bits, the memory cells comprise first type of memory bits and second type of memory bits, the first type of memory bits are used to store valid data, the second type of memory bits are used to store first type of check data, and the first type of check data is obtained by performing error correction encoding on the valid data stored in the first type of memory bits; and the memory controller is configured to: perform error correction on the valid data in which an error occurs by at least using the first type of check data in the second type of memory bits when the error occurs in reading the valid data in the first type of memory bits. In the example of the present disclosure, the valid data is stored in the first type of memory bits of the plurality of memory bits in the memory cells, and the redundant data is stored as the first type of check data in the second type of memory bits of the plurality of memory bits in the memory cells. In this way, error correction can be performed on the valid data in which an error occurs by using the first type of check data in the second type of memory bits when the error occurs in reading the valid data, thereby improving the error correction capability of the memory system.

The forgoing description is only a specific implementation of the present disclosure, but the protection scope of the present disclosure is not limited thereto. Anyone skilled in the art can easily conceive of changes or substitutions within the technical scope of the present disclosure, which should fall within the protection scope of the present disclosure. Therefore, the protection scope of the present disclosure should be determined by the protection scope of the claims.

What is claimed is:

1. A memory system, comprising:

a memory device including a plurality of memory cells having a memory bit count of four bits, the memory cells including a first type of memory bits and a second type of memory bits set according to an encoding rule for storage states from a $0^{th}$ state to a $15^{th}$ state, the first type of memory bits include two bits that are used to store valid data, the second type of memory bits include two bits that are used to store a first type of check data, and the first type of check data is obtained by performing error correction encoding on the valid data stored in the first type of memory bits, wherein four binary data composed of the valid data stored in the first type of memory bits and the first type of check data stored in the second type of memory bits are the same as binary data corresponding to the $0^{th}$ state, a $5^{th}$ state, a $10^{th}$ state, and the $15^{th}$ state, respectively; and a memory controller coupled to the memory device, wherein the memory controller is configured to perform error correction on the valid data in which an error occurs by at least using the first type of check data in the second type of memory bits when the error occurs in reading the valid data in the first type of memory bits.

2. The memory system according to claim 1, wherein the memory controller is configured to:

read data stored in a second memory bit, a third memory bit, and a fourth memory bit of the memory cells when decoding of the valid data stored in a first memory bit by using a second type of check data fails, wherein the first memory bit and the second memory bit are ones of the first type of memory bits, and the third memory bit and the fourth memory bit are ones of the second type of memory bits;

generate first information for the data stored in each memory bit of the memory cells when the data stored in the second memory bit, the third memory bit, and the fourth memory bit of the memory cells is decoded normally, wherein the first information characterizes a probability of the error occurring in the valid data in the first memory bit of the memory cells; and perform the error correction on the valid data in the first memory bit by using the first information.

3. The memory system according to claim 2, wherein the memory controller is configured to decode the valid data which is error-corrected in the first memory bit by using the second type of check data.

4. The memory system according to claim 2, wherein the memory controller includes an error correction module, and wherein the error correction module includes a first decoding circuit, a storage circuit, and a register, wherein the register being configured to at least store a probability mapping table, the probability mapping table including the probability of the error occurring in the valid data in the first memory bit when the data stored in the second memory bit, the third memory bit, and the fourth memory bit is different than the valid data stored in the first memory bit;

the first decoding circuit being configured to generate the first information by using the data stored in the second memory bit, the third memory bit, and the fourth memory bit in combination with the probability mapping table; and the storage circuit being configured to store the first information.

5. The memory system according to claim 4, wherein:

when the first information is a first value, a probability R of the error occurring in the valid data in the first memory bit in a corresponding data case is 0%;

when the first information is a second value, the probability R of the error occurring in the valid data in the first memory bit in the corresponding data case is 100%; and when the first information is a third value, the probability R of the error occurring in the valid data in the first memory bit in the corresponding data case is $0\%<R<100\%$.

6. The memory system according to claim 5, wherein the first decoding circuit is further configured to flip the valid data in the first memory bit in the corresponding data case when the first information is the second value.

7. The memory system according to claim 4, wherein the error correction module further: includes an encoding circuit and a second decoding circuit;

wherein the encoding circuit is configured to perform error correction encoding on the valid data stored in the plurality of the memory cells to obtain the second type of check data; and wherein the second decoding circuit is configured to decode the valid data stored in the plurality of memory cells by using the second type of check data.

8. The memory system according to claim 2, wherein the second type of check data includes low-density parity check codes (LDPC).

9. The memory system according to claim 1, wherein the memory system is part of a solid state disk, and the memory device includes a NAND type memory.

10. An operation method for a memory system including a memory device and a memory controller coupled to the memory device, wherein the memory device includes a plurality of memory cells having a memory bit count of four bits, the memory cells include a first type of memory bits and a second type of memory bits set according to an encoding rule for storage states from a $0^{th}$ state to a $15^{th}$ state, the first type of memory bits include two bits that are used to store valid data, the second type of memory bits include two bits that are used to store a first type of check data, wherein four binary data composed of the valid data stored in the first type of memory bits and the first type of check data stored in the second type of memory bits are the same as binary data corresponding to the $0^{th}$ state, a $5^{th}$ state, a $10^{th}$ state, and the $15^{th}$ state, respectively, the method comprising:

performing error correction encoding on the valid data stored in the first type of memory bits; and performing error correction on the valid data in which an error occurs by at least using the first type of check data in the second type of memory bits when the error occurs in reading the valid data in the first type of memory bits.

11. The method according to claim 10, wherein performing the error correction on the valid data in which the error occurs by at least using the first type of check data in the second type of memory bits when the error occurs in reading the valid data in the first type of memory bits includes:

reading data stored in a second memory bit, a third memory bit, and a fourth memory bit of the memory cells when decoding of the valid data stored in a first memory bit by using a second type of check data fails, wherein the first memory bit and the second memory bit are ones of the first type of memory bits, and the third memory bit and the fourth memory bit are ones of the second type of memory bits;

generating first information for the data stored in each memory bit of the memory cells when the data stored in the second memory bit, the third memory bit, and the fourth memory bit of the memory cells is decoded normally, wherein the first information characterizes a probability of the error occurring in the valid data in the first memory bit of the memory cells; and performing the error correction on the valid data in the first memory bit by using the first information.

12. The method according to claim 11, further including decoding the valid data which is error-corrected in the first memory bit by using the second type of check data.

13. The method according to claim 11, wherein generating the first information for the data stored in all the memory bits of the memory cells includes generating the first information by using the data stored in the second memory bit, the third memory bit, and the fourth memory bit in combination with a probability mapping table, wherein the probability mapping table includes the probability of the error occurring in data in the first memory bit when the data stored in the second memory bit, the third memory bit, and the fourth memory bit is different than the valid data stored in the first memory bit.

14. The method according to claim 11, wherein:

when the first information is a first value, a probability R of the error occurring in the valid data in the first memory bit in a corresponding data case is 0%;

when the first information is a second value, the probability R of the error occurring in the valid data in the first memory bit in the corresponding data case is 100%; and when the first information is a third value, the probability R of the error occurring in the valid data in the first memory bit in the corresponding data case is $0\%<R<100\%$.

15. The method according to claim 14, further including flipping the valid data in the first memory bit in the corresponding data case when the first information is the second value.

16. The method according to claim 11, further including performing error correction encoding on the valid data stored in the plurality of the memory cells to obtain the second type of check data.

17. The method according to claim 11, wherein the second type of check data includes low-density parity check codes (LDPC).

18. The method according to claim 10, wherein the memory system is part of a solid state disk, and the memory device includes a NAND type memory.

19. A memory card comprising:

a plurality of memory cells having a memory bit count of four bits, the memory cells including a first type of memory bits and a second type of memory bits set according to an encoding rule for storage states from a $0^{th}$ state to a $15^{th}$ state, the first type of memory bits include two bits that are used to store valid data, the second type of memory bits include two bits that are used to store a first type of check data, and the first type of check data is obtained by performing error correction encoding on the valid data stored in the first type of memory bits, wherein four binary data composed of the valid data stored in the first type of memory bits and the first type of check data stored in the second type of memory bits are the same as binary data corresponding to the $0^{th}$ state, a $5^{th}$ state, a $10^{th}$ state, and the $15^{th}$ state, respectively;

instructions; and at least one processor configured to perform error correction according to the instructions, wherein the processor is configured to perform error correction on the valid data in which an error occurs by at least using the first type of check data in the second type of memory bits when the error occurs in reading the valid data in the first type of memory bits.

20. The memory card of claim 19, wherein the at least one processor is configured to:

read data stored in a second memory bit, a third memory bit, and a fourth memory bit of the memory cells when decoding of the valid data stored in a first memory bit by using a second type of check data fails, wherein the first memory bit and the second memory bit are ones of the first type of memory bits, and the third memory bit and the fourth memory bit are ones of the second type of memory bits;

generate first information for the data stored in each memory bit of the memory cells when the data stored in the second memory bit, the third memory bit, and the fourth memory bit of the memory cells is decoded normally, wherein the first information characterizes a probability of the error occurring in the valid data in the first memory bit of the memory cells; and perform the error correction on the valid data in the first memory bit by using the first information.

* * * * *

UNITED STATES PATENT AND TRADEMARK OFFICE

CERTIFICATE OF CORRECTION

PATENT NO. : 12,373,290 B2
APPLICATION NO. : 18/348695
DATED : July 29, 2025
INVENTOR(S) : Feng It is certified that error appears in the above-identified patent and that said Letters Patent is hereby corrected as shown below:

In the Claims

In Column 24, Claim 7, Line 62, delete ":".

Signed and Sealed this
Thirtieth Day of September, 2025

John A. Squires
*Director of the United States Patent and Trademark Office*